May 13, 1947.  J. F. RAKOS  2,420,619
HEAD SHIELD FOR WELDERS
Filed Dec. 14, 1945  2 Sheets-Sheet 1
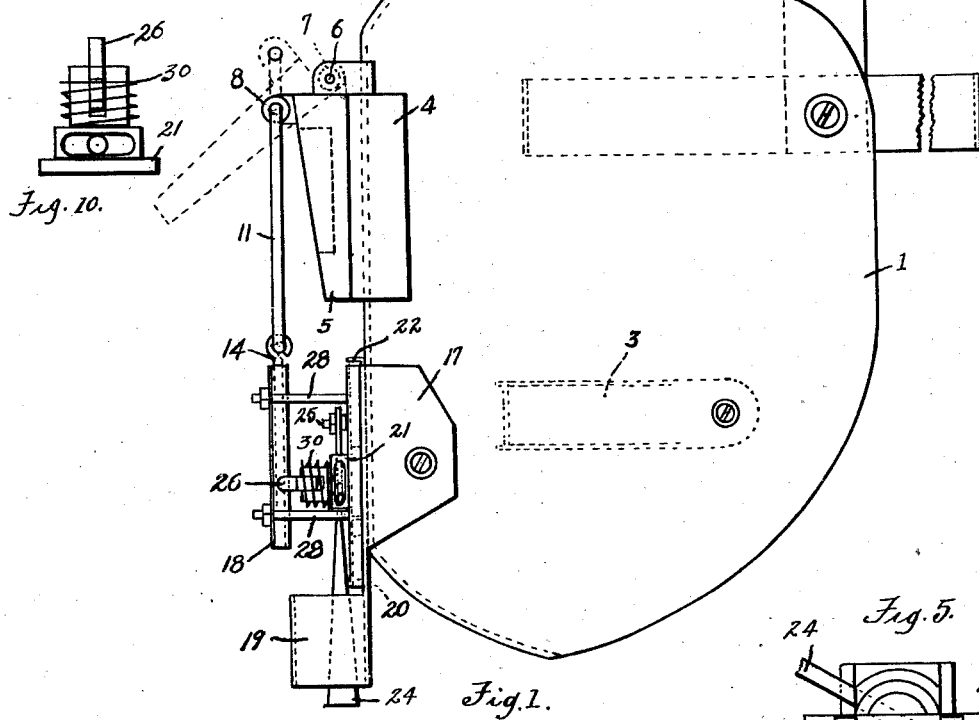
INVENTOR.
Joseph F. Rakos.
BY Lawler & Lawler
Attys.

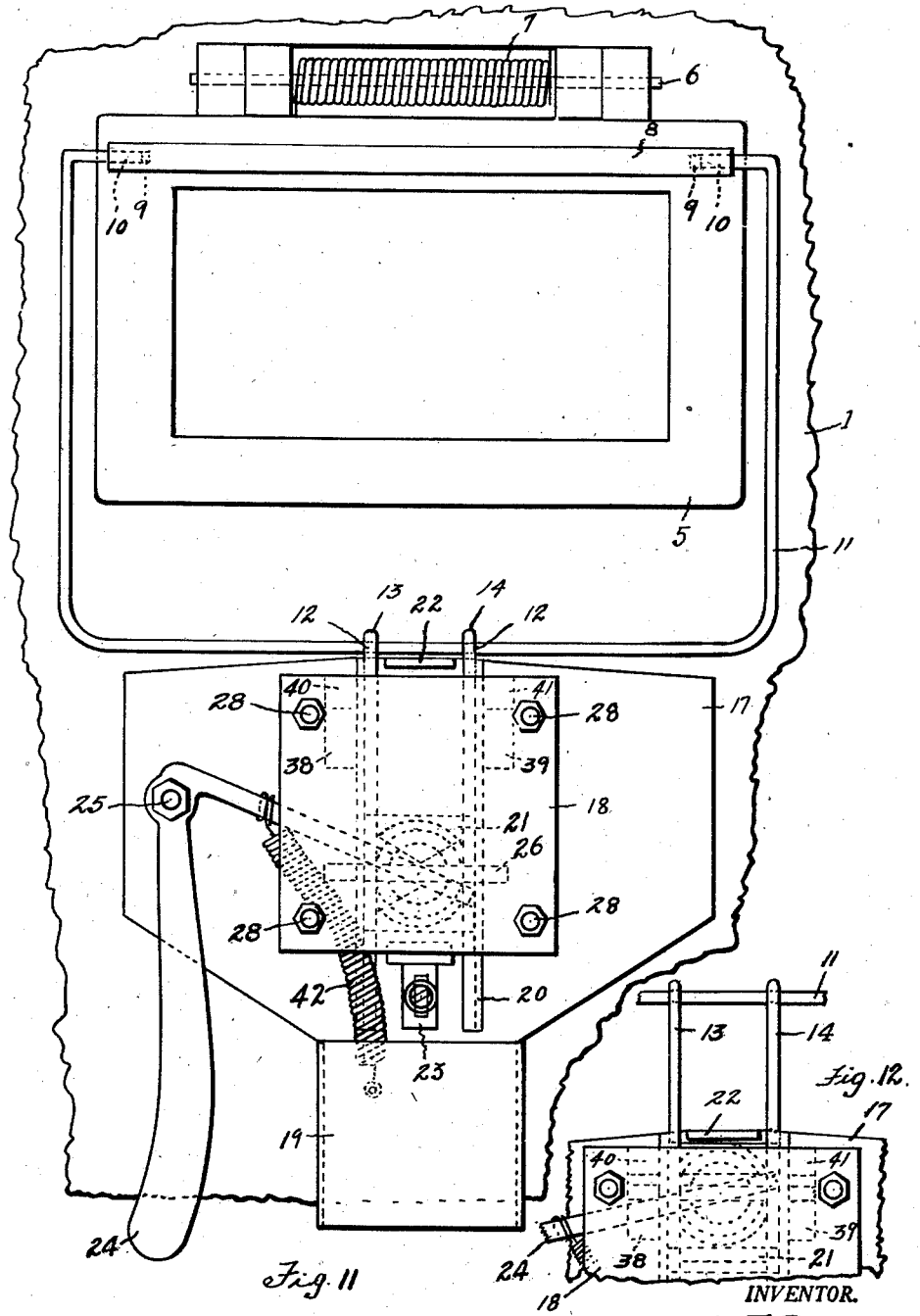

UNITED STATES PATENT OFFICE 2,420,619

HEAD SHIELD FOR WELDERS

Joseph F. Rakos, Cleveland, Ohio, assignor of one-half to John W. Nelson, Cleveland, Ohio Application December 14, 1945, Serial No. 634,917

1 Claim. (Cl. 2—8)

The injurious effect on the eyes of the intense glare from the direct rays of the arc to which those employed in the metal welding operations, are exposed, is well known. The normally moist membrane on the surface of the eye-ball is dried and cracked, which causes the formation of cataracts in the crystalline lens of the eyes and other injurious results to the retina.

The injurious effects are found to come from the action of the ultra-violet rays at one end of the spectrum, and the infra-red or heat rays at the other end, for the eye is not injured by the mid-spectrum white light of moderate intensity.

The object of this invention is to provide a protective shield for the eyes as well as the entire face which is worn on the head of the welder during the welding operation.

Previous to the welding operation the shield is turned up on the head of the wearer so that the entire face is exposed, but just prior to the welding operation is turned down to shield the face and eyes. The shield is provided with a window that may be opened previous to welding to observe the work. The window is provided with a screen in the form of a transparent lens which is removably mounted therein and is interposed between the eyes and the metal being welded, and serves to filter out or absorb the ultra-violet rays and allows a large portion of the mid-spectrum rays to pass as well understood in the art.

The window is hinged at its upper edge to a foundation member which is removably connected to the shield, and is held in closed position thereon by a spring in torsion preferably coiled around the hinge pin, one end of which bears on the foundation member, its other end bearing against the window. The window is provided with a fixed transverse member extending across its top edge, in each end of which there is provided a bore for the reception of the end portion of a bail that engages therein. On the bail there is hinged a window lifting member that is slidably mounted in a guideway provided therefor on the underside of the front plate of the window lifting mechanism.

The window lifting mechanism consists of a pivotally mounted manually operated hand lever operatively associated with a carrier member that is slidably mounted in a guideway provided therefor on the upper surface of the back plate. In the carrier member there is yieldingly mounted a releasable lifting member operating member adapted to engage the upper transverse member in the window lifting member in its path of movement when the carrier member is manually forced upward in the guideway by the hand lever.

The releasable lifting member operating member is released by being forced down the inclined planes on the underside of the front plate, which forces it down in the carrier member against the force of a compression spring mounted on the carrier member, thus releasing the window lifting member from its controlling influence.

The hand lever, the carrier member with its releasable lifting member operating member are returned to their initial position by means of a helical spring, one end of which is connected to the hand lever, its other end being connected to the back plate in a suitable practical manner. In its return to initial position, the releasable lifting member operating member encounters the upper transverse cross member in the window lifting member and as a result it is forced down in the carrier member and rides thereunder to position itself behind it for the next operation.

In addition to the features referred to and others which will be set forth in detail hereinafter, the invention provides a simple and advantageous general construction, adapted to be easily set up and taken apart both for periodical cleaning and for repairs and changes of worn-out or damaged parts.

In the annexed drawings, forming part of this specification, an embodiment of my invention is shown by way of example, many modifications of construction and details being possible without departing from the scope thereof.

Similar numbers of reference refer to similar parts throughout the several views.

Figure 1 is a view in side elevation of the head shield comprising the instrumentalities embodying my invention, a portion of the head gear being broken away. The position of the window when opened is indicated in dotted lines.

Figure 2 is a detail view of the underside of the front plate of the window lifting mechanism, showing the guide-way, the inclined planes and stops, also showing the position of the transverse members in the window lifting member.

Figure 3 is an edge view of the front plate showing the position of the inclined planes.

Figure 4 is a front view of the front plate shown in Fig. 2.

Figure 5 is a plan view of the carrier member with the lifting releasing member mounted therein, the operating lever is shown fragmentary in the carrier member.

Figure 6 is a view in side elevation of the carrier member showing its salient features.

Figure 7 is a detail view of the releasable lifting member operating member apart from the carrier.

Figure 8 is a section on line AA in Figure 7.

Figure 9 is a section on line B—B in Figure 7.

Figure 10 is a detail view of the carrier member with the lifting releasing member to illustrate the location of the transverse groove or channel in the carrier member in which the releasing member is mounted.

Figure 11 is a front view shown in elevation on an enlarged scale of the view shown in Figure 1. The shield is shown fragmentary.

Figure 12 is a fragmentary front view in elevation of a portion of the front plate to illustrate the portion of the window lifting member remaining in the guide-way when the window is open and just prior to it being released to return to its initial position.

Referring to the drawings 1 indicates a conventional head shield with its necessary head band and chin strap 2 and 3 usually installed and employed in this type of head shield. The head shield when worn by the operator in welding is adapted to protect the operator's face and eyes from the direct rays of the welding arc.

On the head shield there is removably connected a foundation member 4 having a window 5 hinged thereto at its upper end. Coiled around the hinge pin 6 there is provided a helical spring 7 in torsion adapted to hold the window in closed position on the foundation member.

Extending across the top edge of the window there is provided a fixed transverse member 8 having in each end thereof a bore 9, 9 for the reception of the ends 10, 10 of the bail 11. See Fig. 11.

Hinged to the bail as at 12 there is provided two downwardly extending legs 13 and 14 held in spaced parallel relationship by means of the transverse members 15 and 16. The bail with its cooperating spaced legs and transverse members constitutes the window lifting member.

The window lifting mechanism comprises the following instrumentalities in combination: two spaced plates, a back plate 17 and a front plate 18, the back plate is connected to the head shield in a suitable practical manner. The plate is so shaped that a portion of it constitutes a handle or grip as at 19. On the back plate there is provided a guide-way 20 of channel cross section in which the carrier member 21 is slidably mounted. At the extreme upper end of and in the guide-way there is provided a stop 22 which limits the upward travel of the carrier member therein. In the guide-way adjacent its lower end there is provided an adjustably mounted stop 23 which limits the downward travel of the carrier member in the guide-way. On the plate 17 there is mounted a hand lever 24 pivotally mounted as at 25. The hand lever is operatively associated with the carrier member that is slidably mounted in the guide-way and is adapted to force the carrier member upward therein.

In the carrier member 21 there is yieldingly mounted a releasable lifting member operating member 26 that frictionally engages the under surface 27 of the front plate 18 which is held in parallel spaced relation relative to plate 17 by means of four shouldered studs 28. On the underside of the front plate 18 there are provided guide-ways 29 in which the window lifting member is slidably mounted and guided in its movement up and down.

The releasable lifting member operating member is held in operative position by means of a helical spring 30 mounted on the carrier member and which forces it into frictional contact with the underside of the front plate. The releasable lifting member operating member is provided with laterally spaced notches 31 and 32 to permit the member to straddle the guideways on the under surface of the front plate, and to relieve frictional contact therewith. The central portion 33 of the releasable lifting member operating member is rounded off from its leading edge 34 backward as at 35. The portions 36 and 37 beyond the notches are rounded over as shown in the cross section shown in Fig. 9.

On the underside of the front plate, laterally of the guide-ways and adjacent the top end thereof there is provided two inclined planes 38 and 39 having at their low points stops 40 and 41.

The hand lever 24 is held in inoperative position by means of a coiled spring 42, one end of which is connected to the lever, its other end being connected to the back plate.

The operation of the device is as follows:

After the head shield has been properly placed on the head and it is desired to open the window on the shield previous to welding, the hand lever and the grip are grasped thus imparting a movement to the lever which is imparted to the carrier member associated therewith forcing it upward in the guide-way on the back plate, on its way up the releasable lifting member operating member 26 that is yieldingly mounted therein engages the transverse member 15 in the window lifting member and it is forced upward thereby until released from its influence by being depressed by the inclined planes on the underside of the front plate and its further upward movement prohibited by the stops associated with the inclined planes. When the window lifting member is released, the coiled spring around the hinge pin closes the window almost instantaneously, while the spring connected to the hand lever returns the carrier member associated therewith to its initial position. On its return to initial position the releasing member is forced down when it engages the transverse member 15 and rides under it to position itself for the next operation.

It will accordingly be seen that I have provided a construction which satisfies the objects of the invention, and while I have shown the invention in a certain physical embodiment, it is to be understood that modifications of the structure may be made by those skilled in this art without departing from the invention as expressed in the claim which follows.

I claim:

In a device of the class described, comprising, in combination, a head shield, a foundation member connected thereto, a window hinged to the foundation member by a hinge pin, a coiled spring in torsion on the hinge pin, a transverse member connected to the upper edge of the window having a longitudinally extending bore in each end thereof, a bail having its ends mounted in the aforesaid bores, a window lifting member hinged to the bail having downwardly extending legs held in spaced parallel relationship by spaced parallel transverse members interposed therebetween, a back plate removably connected to the head shield having a guide-way therein, a stop positioned at the upper end of the guide-way, an adjustably mounted stop positioned in the guide-way at its lower end, a carrier member slidably mounted in the guide-way and limited in its movement up and down by the stops therein, a releasable lifting member operating member yieldingly mounted in the carrier member, a manually operable lever pivotally mounted on the back plate laterally of the guide-way and having one end cooperating with the carrier member, a front plate having guide-ways on the under side thereof, the window lifting member slidably mounted therein, the plate also having on its underside in proximity to its top end, inclined planes positioned laterally of the guide-ways, stops associated with the inclined planes, the inclined planes adapted to cause the releasable lifting member operating member operatively engageable with the lifting member to yieldably move relative to the carrier member to release the window lifting member from its controlling influence thus allowing the coiled spring in torsion on the hinge pin to close the window, and a helical spring connected to the manually operable lever and the back plate adapted to return the lever and the carrier member to their initial position.

JOSEPH F. RAKOS.